United States Patent
Pierce et al.

(10) Patent No.: US 10,562,355 B2
(45) Date of Patent: Feb. 18, 2020

(54) TIRE BEAD

(71) Applicant: COOPER TIRE & RUBBER COMPANY, Findlay, OH (US)

(72) Inventors: Doug Pierce, Elizabethton, TN (US); Dale E. Schimmoeller, Leipsic, OH (US); Greg C. Bowman, Findlay, OH (US); Timothy M. Donley, Weldon, NC (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 891 days.

(21) Appl. No.: 14/783,243

(22) PCT Filed: Apr. 9, 2014

(86) PCT No.: PCT/US2014/033500
§ 371 (c)(1),
(2) Date: Oct. 8, 2015

(87) PCT Pub. No.: WO2014/169038
PCT Pub. Date: Oct. 16, 2014

(65) Prior Publication Data
US 2016/0068027 A1    Mar. 10, 2016

Related U.S. Application Data

(60) Provisional application No. 61/810,040, filed on Apr. 9, 2013.

(51) Int. Cl.
*B60C 15/04* (2006.01)
*B60C 1/00* (2006.01)

(52) U.S. Cl.
CPC ........... *B60C 15/04* (2013.01); *B60C 1/00* (2013.01); *B60C 2001/005* (2013.01);
(Continued)

(58) Field of Classification Search
CPC .............. B60C 15/04; B60C 2015/042; B60C 2015/046
See application file for complete search history.

(56) References Cited

U.S. PATENT DOCUMENTS 3,645,819 A    2/1972  Fujii
3,687,721 A    8/1972  Dardoufas
(Continued)

FOREIGN PATENT DOCUMENTS

JP    H04266506 A    9/1992
JP    05-212816    *    8/1993
(Continued)

OTHER PUBLICATIONS

Gent, Alan Neville and Walter, Joseph D., "Pneumatic Tire" (2006). Department of Mechanical Engineering. Paper 854. p. 7-9,85. (Year: 2006).*

(Continued)

*Primary Examiner* — Robert C Dye
(74) *Attorney, Agent, or Firm* — Fay Sharpe LLP

(57) ABSTRACT

A tire for a motor vehicle having at least one carcass ply comprised of a crown portion and two axially opposite side portions terminating in beads for mounting the tire on a rim. A tread band and a belt structure are interposed between the carcass structure and the bead. Each bead includes on elongated cord comprised of a first yarn, such as aramid, having a melting or decomposition point $T_1$, and a second yarn, such as nylon, having a melting point $T_2$, wherein $T_1 > T_2$, and $T_2$ is greater than 40° C.

14 Claims, 3 Drawing Sheets

(52) U.S. Cl.
CPC .. *B60C 2015/042* (2013.01); *B60C 2015/044* (2013.01); *B60C 2015/046* (2013.01)

(56) References Cited

U.S. PATENT DOCUMENTS

| | | |
|---|---|---|
| 3,942,574 A | 3/1976 | Bantz |
| 4,155,394 A * | 5/1979 | Shepherd .............. B60C 9/0042 |
| | | 139/426 R |
| 4,617,236 A | 10/1986 | Marshall |
| 4,823,857 A | 8/1989 | Orjela et al. |
| 5,215,613 A | 6/1993 | Shemenski et al. |
| 5,307,853 A | 5/1994 | Okuda |
| 5,882,458 A | 3/1999 | Kolb et al. |
| 6,571,847 B1 | 6/2003 | Ueyoko |
| 6,921,572 B2 | 7/2005 | Van Campen |
| 2008/0196812 A1 | 8/2008 | Turvey et al. |
| 2009/0090447 A1 | 4/2009 | Baldwin, Jr. |
| 2009/0194215 A1 | 8/2009 | Daghini et al. |
| 2010/0020014 A1 | 8/2010 | Wakahara et al. |
| 2015/0174968 A1* | 6/2015 | Huyghe .................. B60C 15/04 |
| | | 152/540 |

FOREIGN PATENT DOCUMENTS

| | | |
|---|---|---|
| JP | 06-143914 * | 5/1994 |
| JP | 2746764 B2 | 5/1998 |
| WO | 01061091 A1 | 8/2001 |

OTHER PUBLICATIONS

Camesa. Camesa Products: Tire Bead Wire. Product literature (online). WireCo Worldgroup, Oct. 1, 2012, https://web.archive.org/web/20121001043507/http:/www.camesawire.com/product-catalog/Tire-Bead-Wire.

The Thread Exchange, Kevlar Thread Information, Product literature (online), The Thread Exchange, Inc., May 13, 2011, https://web.archive.org/web/20110513211248/http://www.thethreadexchange.om/miva/merchant.

* cited by examiner

TIRE BEAD

The application claims the benefit of U.S. Provisional Application Ser. No. 61/810,040, filed Apr. 9, 2013, the contents of which are incorporated herein by reference.

This invention was made with government support under Grant No. DDE-FOA 0000239 awarded by the United States Department of Energy. The government has certain rights in the invention.

BACKGROUND

With new legislative requirements in Europe and proposed requirements in other parts of the world, the importance of tire weight and improved fuel efficiency is more important than ever. A number of technical approaches have been taken to address these problems. One area of technology under investigation is to replace the current steel beads with aramid beads. This technology has the potential to reduce the weight of the tire. The present exemplary embodiment relates to development of aramid beads for tires.

A tire generally comprises: a carcass structure; a tread band in a position radially external to the carcass structure; a belt structure interposed between the carcass structure and the tread band. A tire generally further comprises a pair of sidewalls applied to the carcass structure in axially opposite positions. The ends of the at least one carcass ply are folded back or secured to two annular reinforcing elements, i.e. the so-called "bead bundles", and the tire region which comprises the bead bundle is known as "tire bead". Typically, in a position radially external to the bead bundle, the tire bead further comprises an elastomeric insert, conventionally called "bead filling" or "bead apex", which extends radially outwardly from the respective bead bundle.

A tire bead performs the function of anchoring the tire to a respective wheel rim thereby ensuring, in case of a tubeless tire, a sealing effect between the tire and the wheel rim, the latter being provided in correspondence of the bead mounting position and generally comprising two substantially conical coaxial surfaces which act as the supporting base for the tire beads. The surfaces generally terminate in a flange, radially projecting outwardly, that supports the axially outer surface of the bead and against which the latter abuts by virtue of the tire inflation pressure.

The tire bead is required to withstand relevant deformations that arise during the fitting operation of the tire on a respective wheel rim. In fact, the diameter of the radially internal annular surface of the bead bundle is smaller than the radially external diameter of the rim flange and is chosen so that, once the tire bead has been positioned in the respective bead seat of the rim, after passing over the flange, it is pushed by the pressure of the tire inflating fluid along the diverging surface of the bead seat against the axially internal surface of the flange. Generally, the fitting of a tire on a respective rim starts with the deformation (ovalisation) of the tire bead so that a portion thereof is able to pass over the flange. Successively, the rest of the tire bead is caused to completely pass over the flange such that the bead is positioned in the closest bead seat. Then the bead is pushed axially towards the opposite bead seat so as to cause it to fall into the central groove of the rim. In this way, once the bead is located inside the abovementioned central groove, the equatorial plane of the tire may be inclined with respect to the equatorial plane of the rim so as to allow also the opposite bead to pass over the flange and be positioned in the corresponding bead seat, by means of ovalisation thereof (and hence of ovalisation of the respective bead bundle).

Finally, the tire is inflated so that both the beads come into abutment against the axially internal surfaces of the flange. Owing to the rigidity of the bead bundle, the fitting/removal operations of the tire onto/from the rim may require the use of levers with which it is possible to apply a force sufficient to deform the bead bundle, modifying the configuration from a substantially circular one to an oval one, so as to allow, as mentioned above, the bead to pass over the flange.

To fulfill these functions, the beads are required to have not only sufficient strength to withstand an applied tension but also the rigidity that is necessary to retain the tire on a wheel rim while maintaining a sufficient dimensional precision on the inner periphery of the bead portion to insure good fit to the rim.

In order to satisfy these strength and rigidity requirements, a plurality of high-modulus steel wires have been used as conventional beads. One common type of tire bead is called the single wire tire bead. With a single wire tire bead, a single wire, or coated wire, is wound through a plurality of turns in the angular direction to form a ring shape. FIG. 1 shows a cross section (cross hatching omitted for clarity of illustration) of a single wire tire bead having a hexagonal cross section wire center geometry, with each circle representing one turn of the wire. A ribbon wire center geometry is shown in FIG. 2.

Although steel beads have demonstrated long term commercial success, such conventional beads have had the problem that their weight accounts for about 5% of the tire weight, which is one of the obstacles to the objective of realizing lighter tires that is presently gaining increasing importance.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a tire for a motor vehicle is provided. The tire includes a carcass structure having at least one carcass ply comprised of a crown portion and two axially opposite side portions terminating in beads for mounting the tire on a rim. A tread band and a belt structure are interposed between the carcass structure and the beads. Each bead includes an elongated cord comprised of a first yarn having a melting or decomposition point $T_1$, and a second yarn having a melting point $T_2$, wherein $T_1 > T_2$ and $T_2$ is greater than 40° C.

According to a further embodiment, a tire bead comprised of a plurality of polymeric cords arranged parallel to one another to form a plurality of wraps is provided. The wraps form a concentric ring which make up the bead bundle. The cords include a combination of polymeric yarns having a melting or decomposition point $T_1$ and polymeric yarns having a melting point $T_2$, wherein $T_1 > T_2$, and $T_2$ is greater than 40° C.

According to a third embodiment, a passenger tire bead is provided. The bead includes a plurality of polymeric cords arranged parallel to one another to form between 7 and 18 wraps in the bead bundle. The bead bundle has an internal circumference of at least about 40". A cross section of the bead bundle has an average diameter of between about 0.3 and 0.4 inches. The bead has a breaking strength of at least 20,000 (N) and a weight of less than 100 grams.

According to a fourth embodiment, a motorcycle tire bead is provided. The bead includes a plurality of polymeric cords arranged parallel to one another to form between 6 and 18 wraps in the bead bundle. The bead bundle has an internal circumference of at least about 40". A cross section of the bead bundle has an average diameter of between about 0.25 and 0.4 inches. The bead bundle has a breaking strength of at least 11,000 (N) and a weight of less than 100 grams.

According to an additional embodiment, a truck or bus tire bead is provided. The bead includes a plurality of polymeric cords arranged parallel to one another to form between 20 and 50 wraps in the bead bundle. The bead bundle has an internal circumference of at least about 59". A cross section of the bead bundle has a minimum dimension of 0.10" and a maximum dimension of 1.00". The bead bundle has a breaking strength of at least 106,000 (N) and a weight of less than 1500 grams.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which.

DETAILED DESCRIPTION

Figure 1:
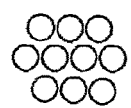
FIG. 1 is a cross sectional view of a first prior art tire bead.
Figure 2:
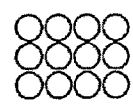
FIG. 2 is a cross sectional view of a second prior art tire bead.

The present disclosure is directed to a vehicle tire including a bead constructed of at least two polymers, such as aramid and nylon. One benefit of using a single treated aramid cord to form hex (see FIG. 1) or ribbon (see FIG. 2) beads is that current steel bead forming equipment can be utilized. Moreover, a treated aramid cord can be spooled off and sent through an extrusion die where it is coated with rubber.

The present embodiment is advantageous because handling and shipping of spools of aramid cord is relatively easy, economical and moreover, can be implemented commercially in the same manner as traditional spooled wire. Particularly, the rubber coated aramid cord can be processed through steel bead hex or ribbon forming equipment to produce aramid beads. Final tire weight can be lighter (2% to 6% expected) and vehicle fuel consumption can be improved by the lighter weight tire.

However, in order for the current bead forming equipment to work, the aramid cord must be stiff. This is accomplished by interweaving a strand of thermoplastic material with the aramid cord which melts during the heat treating process. Once the thermoplastic re-hardens, it produces a stiff aramid cord. The stiff cord allows it to be processed through current steel cord bead processing equipment.

The cord of the present disclosure used for winding into a tire bead can be the type of cord described in U.S. Pat. No. 6,921,572, the disclosure of which is herein incorporated by reference. The cord can be made up of at least two yarns, the first being a yarn having a melting or decomposition point $T_1$, and the second being a yarn have a melting point $T_2$, wherein $T_1 > T_2$, and $T_2$ is greater than 40° C. The ratio of the linear density of the first yarn to the linear density of the second yarn can be between 1,000:1 and 1:1, between 100:1 and 4:1, or between 35:1 and 15:1.

Suitable materials for the yarn with the relatively higher melting or decomposition point ($T_1$) include aromatic polyamides (e.g. aramid), such as poly(para-phenylene terephthalamide). Suitable materials for yarns with the relatively lower melting point ($T_2$) can be polyesters, polyamides, polyolefins, elastanes, thermoplastic vulcanizates, and acrylics. According to one embodiment, the $T_1$ polymer can be aramid and the $T_2$ polymer can be nylon.

To provide a suitable combination of strength and stiffness the cord can contain between about 85 and 97% by weight $T_1$ polymer and between about 3 and 15% by weight $T_2$ polymer. In certain embodiments, between about 88 and 95% by weight $T_1$ polymer and between about 5 and 12% by weight $T_2$ polymer will be present. Of course, it is also contemplated that a minor portion of a third or fourth yarn could be included in the cord.

The distribution of the second yarn is controlled by intertwining according to appropriate twisting schemes and is dependent on the type of cord construction. The twisting scheme and the amount of second yarn relative to the first yarn used depend on the desired bundle cohesion and can be determined by those skilled in the art. Twisting regimens are well-known in the art. The twisting can be carried out with any suitable twisting equipment. Typically, the yarn will include less than 2 twists per mm. However, in certain embodiments an untwisted yarn may be desirable. Examples of suitable cord materials include Twaron D1014, Twaron D2200 (3220 dtex×2×4+thermal adhesive) and Twaron D2200 (3220 dtex×1×4+thermal adhesive) available from Teijin Limited of Wuppertal, Germany.

The method of manufacturing the cord comprises the steps of intertwining the first and the second yarn and then heating the intertwined cord at a temperature between $T_1$ and $T_2$. The heating step is performed to fixate the first yarn bundles by melting the second yarn. The molten filaments embrace the single plies, thereby interlocking the filaments and holding them in place. In some embodiments, the heating step can be integrated with or followed by a step wherein the cord is subjected to a dipping treatment with a rubber adhesion material.

More particularly, in order to ensure that the cord has good adhesion with the matrix material of the tire in which it will be embedded, it is desirable to coat the cords with an adhesive. Suitable adhesive coatings include epoxy compounds, polymeric methyl diphenyl diisocyanate and polyurethanes having ionic groups. Highly suitable adhesive coatings for use in the case of poly(para-phenylene terephthalamide) is a resorcinol/formaldehyde/latex (RFL) system. Typically, the coated cord of the present disclosure will have a gauge size of greater than 0.05" and less than 0.20".

For technical and economic reasons, the fusion step can take place as a part of the dipping process. By selecting a thermoplastic adhesive with a melting point within the range of temperatures used for the dipping treatment, the heat setting can be combined with the dip-curing steps. The aqueous emulsion is preferably applied to cord as an over-finish after drawing has been completed in any of the conventional ways of applying finishes. A satisfactory manner of applying the finish is by feeding the emulsion to a trough equipped with a rotatable roll dipping therein and passing the cord in contact with the roll. The rate of rotation of the roll can be adjusted to provide desired pick-up of coating by the yarn. By selecting a thermoplastic adhesive with a melting point between 200-250° C., the heat-setting can be combined with the curing step in a conventional dipping process. Integrated RFL dipping and heat setting is one example.

Figure 3:
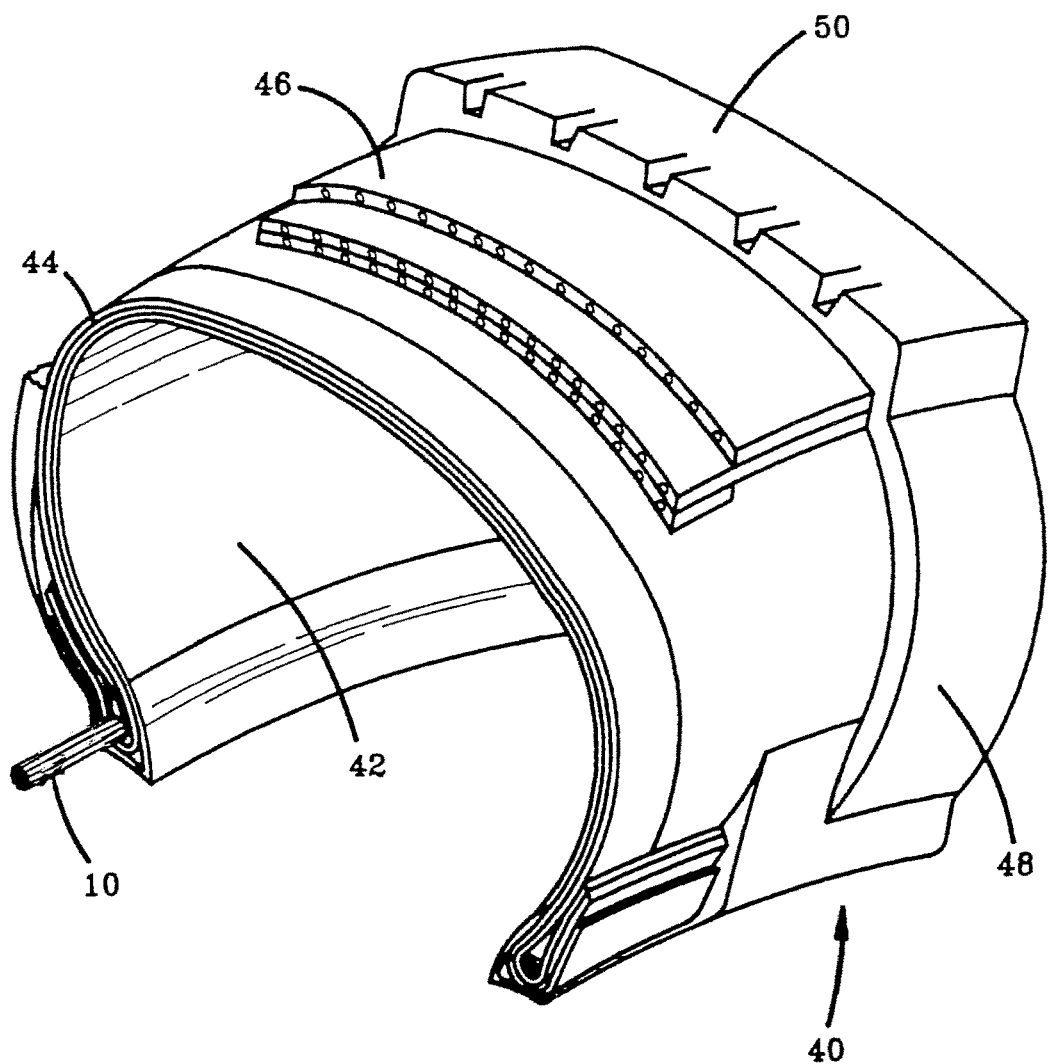
FIG. 3 illustrates a tire including a polymeric bead bundle.

In the construction of vehicle tires it is the usual practice to incorporate a stiffening bead at both the inside and outside openings where the tire is to be mounted upon a rim. With reference to FIG. 3, a pneumatic tire 40 made incorporating a polymeric bead ring 10 is illustrated. The tire is made as is conventional in the tire building art and includes at least a pair of bead rings 10, carcass plies 44 which are wrapped around the bead rings 10, an optional inner liner 42 disposed inwardly of the carcass plies, optional belts or breakers 46 disposed in a crown area of the tire over the carcass plies, tread 50 disposed over the crown area of the tire and sidewalls 48 between the tread 50 and beads 10.

The tire illustrated in FIG. 3 represents a typical passenger vehicle tire. Of course, the present embodiment is equally suitable for use in vehicle tires, such as, motorcycle, truck and/or bus. In fact, because of the relative increase in weight reduction, the present disclosure may have particular benefit in large tire vehicles where the bead bundle has a large internal circumference (e.g. >59") and/or includes a large number of cord wraps (e.g. >20).

Listed in the following Table are typical bead breaking strengths for various types of vehicle tires.

| Bead Breaking Strength by segment | | | |
| --- | --- | --- | --- |
| | Motorcycle | Passenger Vehicle | Truck/Bus Vehicle |
| Bead Breaking Strength Min | 11,000N | 20,000N | 106,000N |
| Bead Breaking Strength Max | 50,000N | 120,000N | 315,000N |

All of these values can be obtained using the instant invention by controlling the number of wraps of cord in the bead bundles. It is noted that in the case of large vehicle tires such as bus and truck which may have a greater number of cord wraps, it may be advantageous to provide the bead bundle with a fabric wrap to help maintain its integrity. An exemplary fabric wrap material is rubber coated nylon or polyester cord or square woven fabric.

Figure 4:
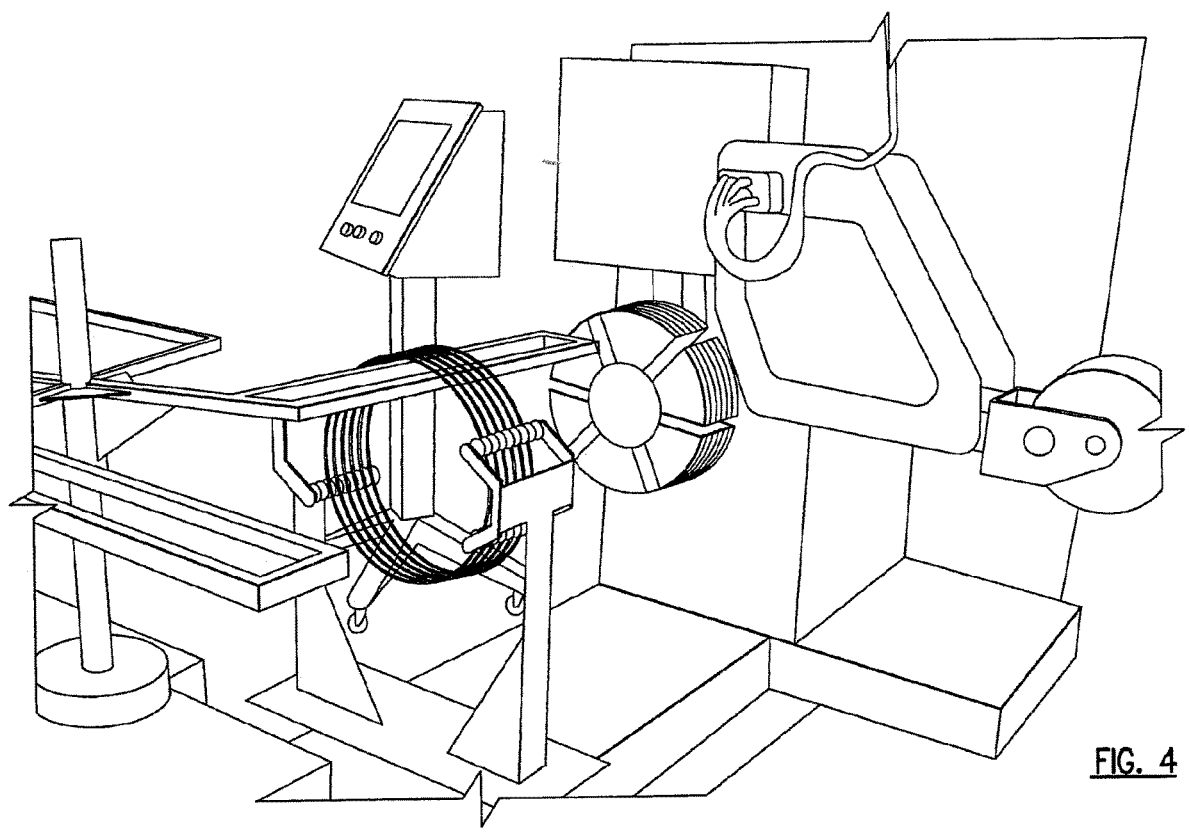
FIG. 4 is a perspective view of a conventional bead line winder.

One method of forming the polymeric tire beads of the present embodiment is to grip the leading end of a polymer cord and wind multiple turns of the cord in a groove on a drum and to cut the cord, forming a trailing end of the cord on the wound bead and a leading end to be gripped for winding the next bead. Pre-assembled tire polymeric cord based bead assemblies can be built on a conventional bead line winder. A suitable conventional bead winding apparatus is illustrated in FIG. 4 and more fully described in U.S. Patent Publication 2008/0196812, the disclosure of which is herein incorporated by reference. Suitable equipment is available from Bartell Machinery Systems, LLC of Rome, N.Y.

According to one aspect of the disclosure, the cords are coated with rubber or a similar synthetic covering before and/or during the winding process used to form the bead. By maintaining a sufficient temperature to render the coating tacky, adjacent cords in the bead adhere to one another. Exemplary coating materials include SBR rubber compounds, BR rubber compounds, natural rubber compounds or blends thereof.

Characteristics of a suitable polymeric bead bundle are reflected in the following Table.

| | Aramid Cord Bead Properties |
| --- | --- |
| Treatment | RFL (resorcinol formaldehyde latex) Thermo Adhesive Thermal Polyamide Perlon Polyamide Thermoplastic |
| Size/Denier of the individual cord forming the bead | 2.14 mm diameter, 80-90 mil thickness |
| Breaking Strength | 4000-4500 kN |
| Hex Wraps | 7 to 15 wraps |

Examples

Two different aramid cords were formed into hex beads using current bead forming equipment. In each example, an aramid nylon cord including a cord coating of Cooper Tire bead insulation was wound into a substantially consistent internal circumference (IC), 2-3-4-3-2 hex bead using a Bartell Manufacturing bead forming apparatus. Example A used Teijin Twaron D1014 cord having a gauge size 0.087", and a cord breaking strength of 4000N. Example B used Teijin Twaron D2200 cord having a gauge size of 0.083", and a cord breaking strength of 4000N. An average diameter of the Example A and B beads was about 0.34 inches. The beads of Examples A and B were then compared to a control bead of 3-4-3 high tensile steel wire having a gauge of 0.062 inches by evaluating in a 225/60R16 tire of conventional design.

Testing:
SAE: J1561 High speed test: Four tires were tested for a 'T' speed rating.
Hydroburst test—Two tire using each bead was filled with water under pressure until the tire burst. In a successful test, the tire does not fail at the bead.
CFR571.139 S6.2—High speed performance test mandated by DOT
CFR571.139 S6.3—Tire Endurance test mandated by DOT
CFR571.139 S6.4—Low inflation performance mandated by DOT

| | Test: Pass/Fail | | | | |
| --- | --- | --- | --- | --- | --- |
| Example | SAE: J1561 | Hydro-burst | CFR571.139 S6.2 | CFR571.139 S6.3 | CFR571.139 S6.4 |
| Control - Steel bead | Pass | Pass | Pass | Pass | Pass |
| A D1014 bead | Pass | Pass | Pass | Pass | Pass |
| B D2200 bead | Pass | Pass | Pass | Pass | Pass |

Figure 5:
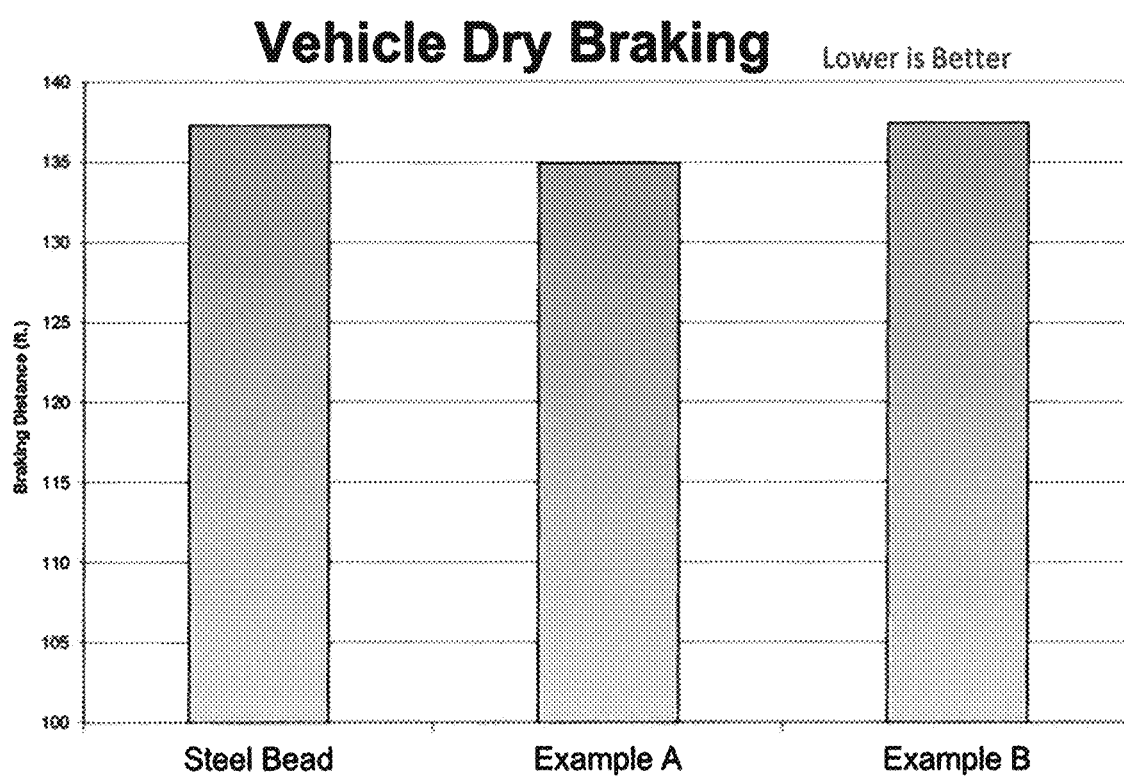
FIG. 5 is a graphical depiction of vehicle dry braking from the Examples.

Dry Braking—as shown in FIG. 5, the Example A tire provided directionally better test results than the control. The Example B tire had test results equivalent to the control tire.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A tire for a motor vehicle, comprising: a carcass structure comprising at least one carcass ply, said carcass structure comprising a crown portion and two axially opposite side portions terminating in beads for mounting the tire on a rim; a tread band; and a belt structure interposed between said carcass structure and said tread band, wherein each bead includes elongated cord comprised of a first yarn having a melting or decomposition point $T_1$, and a second yarn having a melting point $T_2$ wherein $T_1>T_2$, and $T_2$ is greater than 40° C. and wherein each bead is comprised of a plurality of said elongated cords arranged parallel to one another to form between 12 and 18 wraps, said wraps forming a concentric ring, said ring having a circumference of at least about 40 inches, said beads having an average diameter of between about 0.3 and 0.4 inches, and said beads having a breaking strength of at least 20,000 (N) and a weight of less than 100 grams.

2. The tire of claim 1 wherein the $T_1$ yarn is comprised of aramid and the $T_2$ yarn is comprised of nylon.

3. The tire of claim 1 wherein the $T_1$ yarn comprises between 85 and 97% by weight of the cord and the $T_2$ yarn comprises between 3 and 15% by weight of the cord.

4. The tire of claim 1 wherein each cord is comprised of between 3 to 1 and 5 to 1 of the first yarn relative to the second yarn.

5. The tire of claim 1 wherein said first yarn is at least substantially untwisted.

6. The tire of claim 5, wherein said second yarn has less than 2 twists per mm.

7. The tire of claim 1 wherein said cord comprises a diameter of at least 0.05".

8. A tire bead consisting essentially of a plurality of polymeric cords arranged parallel to one another to form a plurality of wraps, said wraps forming a concentric ring, said cords being comprised of a combination of polymeric yarns having a melting or decomposition point $T_1$ and polymeric yarns having a melting point $T_2$, wherein $T_1>T_2$, and $T_2$ is greater than 40° C.

9. The tire bead of claim 8 wherein said $T_1$ polymer consists essentially of aramid and said $T_2$ polymer consists essentially of nylon.

10. The tire bead of claim 9 wherein said aramid comprises between 85 and 97% and nylon comprise between 3 and 15% by weight of each cord.

11. The tire bead of claim 8 consisting of a plurality of polymeric cords arranged parallel to one another to form a plurality of wraps, said wraps forming a concentric ring, said cords being comprised of a combination of polymeric yarns having a melting or decomposition point $T_1$ and polymeric yarns having a melting point $T_2$, wherein $T_1>T_2$, and $T_2$ is greater than 40° C.

12. A tire for a motor vehicle, comprising: a carcass structure comprising at least one carcass ply, said carcass structure comprising a crown portion and two axially opposite side portions terminating in beads for mounting the tire on a rim; a tread band; and a belt structure interposed between said carcass structure and said tread band, wherein each bead includes elongated cord comprised of a first yarn having a melting or decomposition point $T_1$, and a second yarn having a melting point $T_2$ wherein $T_1>T_2$, and $T_2$ is greater than 40° C. and wherein each bead is comprised of a plurality of said elongated cords arranged parallel to one another to form between 6 and 18 wraps, said wraps forming a concentric ring, said ring having a circumference of at least about 40 inches, said beads having an average diameter of between about 0.25 and 0.4 inches and said beads having a breaking strength of at least 11,000 (N) and a weight of less than 100 grams.

13. A tire for a motor vehicle, comprising: a carcass structure comprising at least one carcass ply, said carcass structure comprising a crown portion and two axially opposite side portions terminating in beads for mounting the tire on a rim; a tread band; and a belt structure interposed between said carcass structure and said tread band, wherein each bead includes elongated cord comprised of a first yarn having a melting or decomposition point $T_1$, and a second yarn having a melting point $T_2$ wherein $T_1>T_2$, and $T_2$ is greater than 40° C. and wherein each bead is comprised of a plurality of the elongated cords arranged parallel to one another to form between 20 and 50 wraps, said wraps forming a concentric ring, said ring having a circumference of at least about 59 inches, said beads having a minimum dimension of 0.10" and a maximum dimension of 1.00", and said beads having a breaking strength of at least 106,000 (N) and a weight of less than 1500 grams.

14. The tire of claim 13 wherein the beads include a fabric wrap.

* * * * *